June 18, 1968 C. D. SKIRVIN 3,389,298
SINGLE-TRANSISTOR FLASHER CIRCUIT
Filed July 16, 1965
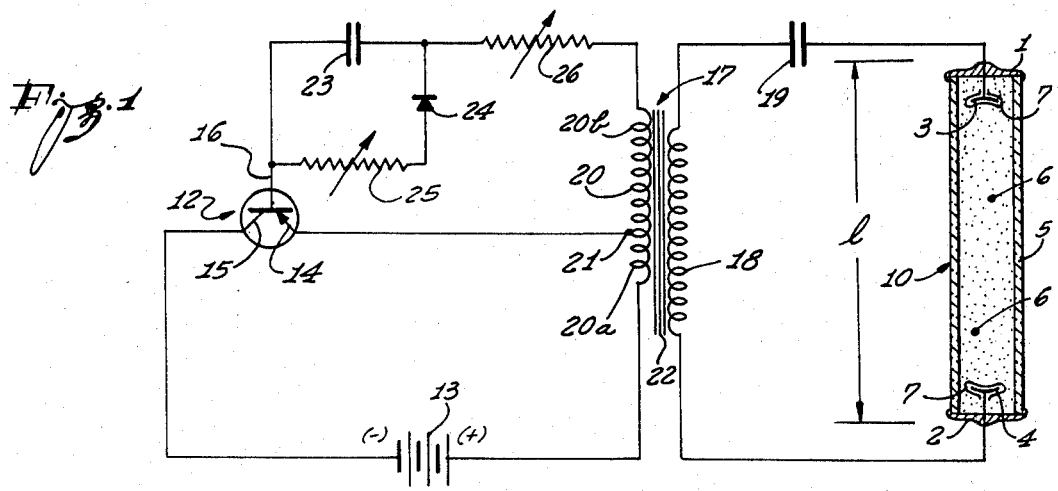
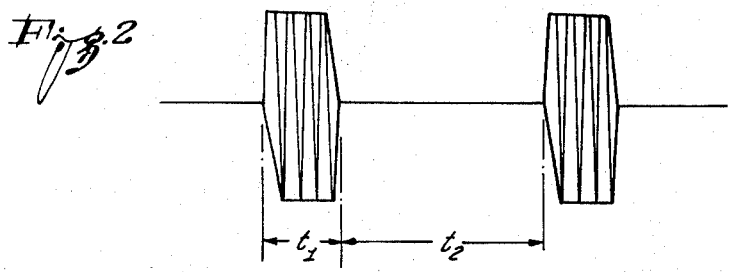
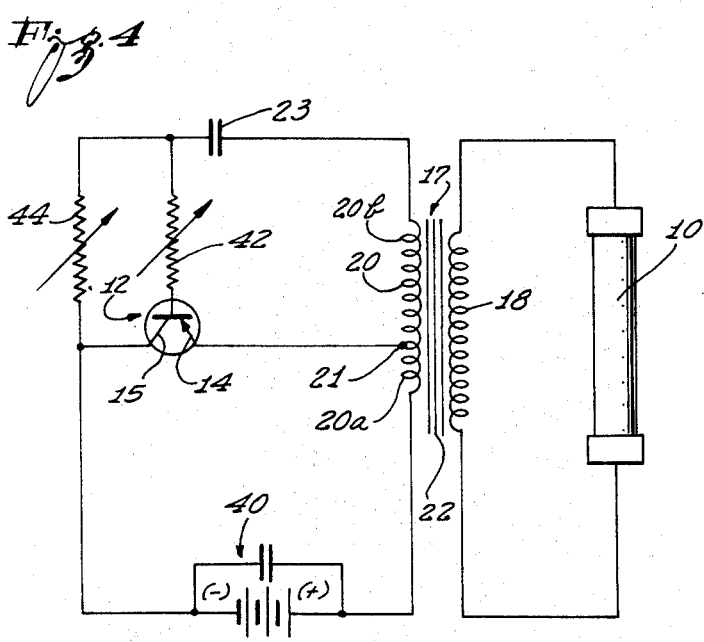
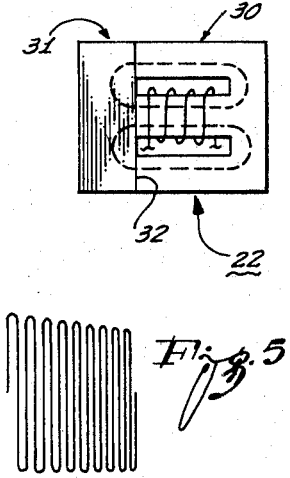
INVENTOR:
Clifford D. Skirvin
Attorneys United States Patent Office 3,389,298
Patented June 18, 1968

3,389,298
SINGLE-TRANSISTOR FLASHER CIRCUIT
Clifford D. Skirvin, Pomona, Calif., assignor to Microdot Inc., South Pasadena, Calif., a corporation of California
Continuation-in-part of application Ser. No. 442,368, Mar. 24, 1965, which is a continuation-in-part of application Ser. No. 278,059, May 6, 1963. This application July 16, 1965, Ser. No. 472,555
17 Claims. (Cl. 315—206)

ABSTRACT OF THE DISCLOSURE

This invention relates to a system for producing flashes of light in a tube which is provided with gas at a relatively low pressure. The system produces the flashes during the charging of a capacitor which is included in the system. The flashes are produced at relatively high frequencies corresponding to the frequencies at which the gas is resonant in the tube when ionized.

---

This is a continuation-in-part of application Ser. No. 442,368, now abandoned, filed by me on Mar. 24, 1965, which, in turn, is a continuation-in-part of application Ser. No. 278,059, now abandoned, filed by me on May 6, 1963.

This invention relates generally to lighting systems, and more particularly concerns a lighting system having both a novel flasher circuit or pulse generator utilizing a single transistor, characterized in that the control of transistor oscillation is achieved by a novel combination of capacitance, resistance, inductance and/or unidirectionally conductive means in the emitter-base circuit of the transistor, and also by new lighting tube principles. As will appear, the invention provides as one feature worthy of protection in itself, a simple and dependable flasher or pulse generator circuit of high efficiency, two specific examples of which are herein described in detail.

In many lighting situations, it is desirable to have the light producing element energized only intermittently, so that a flashing or blinking effect is achieved. Many such flashers must be operated from a battery and must be left for long periods of time without battery replacement or recharge as is true, for example, with the flashing orange lights of excavation barricades or the small flasher units used on shelf displays in retail establishments. In the above and other flasher applications, there is a large market for a small and inexpensive unit comprising battery, flasher circuit and lighting device; and, of course, the longer the life of the unit, the better. The general object of this invention is to supply such a flasher unit that is cheap, compact and economical of battery power.

Most flasher circuits in the past have been of the blocking oscillator type; see, for example, U.S. Patent No. 3,016,478, KaDell. A blocking oscillator flasher "fires" or switches into conduction its transistor or other active element by the buildup of voltage on a capacitor and, accordingly, has a short (3–7 microsecond) "on" time, as shown in KaDell, FIGURE 4, and a declining power and voltage level, of which FIGURE 5 of KaDell is a typical example. Moreover, the waveform put out by such an oscillator is not the most efficacious type for lighting applications, in terms of lumens/watt, or light output per unit power input. Another important difference between the circuit that is one feature of applicant's invention and the circuit of KaDell is that the circuit of KaDell produces the oscillations during the discharge of the capacitor whereas applicant's invention produces the oscillations for lighting the flasher unit during the charge of a capacitor. This causes applicant's invention to produce oscillatory energy for lighting the flasher tube during a considerably greater proportion of the time than in KaDell's circuit.

Considering the flasher circuit aspect of the invention, it broadly comprises in one embodiment an AC-responsive light source or illuminating device, a transistor or other active switching device, a DC or other power source of relatively low voltage in the emitter-collector circuit of the transistor, a transformer of critical air gap dimensions and having a secondary winding electrically connected with the light source and a primary winding in the emitter-base circuit of the transistor, as well as in the emitter-collector circuit.

In addition, a time-constant capacitance or other charge-storage means is provided in the emitter-base circuit and adapted to charge during oscillation of the transistor. In one specific circuit disclosed herein, a unidirectionally conductive means is connected in parallel with the capacitance to provide for discharge thereof during blocking of transistor oscillations, and resistance means is connected in the emitter-base circuit to establish capacitance charge and discharge timing. In another specific circuit disclosed herein, capacitance charge and discharge are timed by two resistors which alternately become the most significant resistive means in series with the capacitor depending on whether the oscillator transistor is "on" or "off." These two circuits without the flasher or light source connected in the secondary or output winding of the transformer will serve very well as improved pulse generators.

More specifically, in one circuit according to the invention the resistance means in the emitter-base circuit includes a first resistance in series with said capacitance and the input winding of the transformer to establish the charge time of the capacitor, during which the transistor oscillates. Further, the resistance means includes a second resistance connected in parallel with the capacitance and in series with the unidirectional conductive means such as a diode, such second resistance establishing the capacitance discharge time, during at least some of which the transistor oscillations are blocked. In the other circuit according to the invention, a first resistor between the charging capacitor and the negative power supply controls discharge time and therefore the "off" time of the flasher circuit transistor, while a second resistor between the charging capacitor and the transistor base or control electrode controls the charging of the capacitor and thus the "on" time of the transistor.

Other features of the instant invention relate to the design, construction and contents of the luminescent tube in which the flasher lighting effect actually takes place. For tubes of conventional length such as 12", the gas pressure in the tube is less than that in the prior art. This constitutes an important feature of applicant's invention. Furthermore, whereas prior art tubes were pumped to a certain pressure determined by tube diameter and the exact luminescent gas mixture being used, the tubes of the instant invention vary in gas pressure, depending on their length, in order to cause the luminescent gas to provide a ballasting effect without the necessity of including special ballast members such as transformers. This ballasting effect occurs because, at frequencies where the tube gas is in resonance, it presents a high impedance as in a parallel resonant electronic circuit, thus limiting current and acting as a ballast. On the other hand, at frequencies where the gas is not in resonance and its impedance is relatively low, such that relatively high current flow can occur, the tube will not provide the ballasting function necessary to compensate for the negative volt-ampere characteristics of the tube and to limit current flow so the tube does not burn up. Because of this, the tube has to be maintained at proper gas pressures for maintaining resonances within the tube, this pressure depending, in part, upon the length of the tube. Accordingly, the invention includes the heretofore unknown principle of increasing tube pressure with increases of tube length, so that for the same voltage, current, and/or power, the dwell time or flash time will be the same regardless of the length of tube used in the circuit. This occurs because the increased pressure decreases molecular travel distance in such proportion that the travel time across the tube becomes the same in spite of the increased length thereof.

In other words, the various luminescent tube features of applicant's invention take advantage of the characteristics of gas tubes heretofore unrecognized, that a gas tube of a certain length and diameter and having a certain pressure of gas in the tube will maintain a relatively low power dissipation level across the tube, and thus relatively low current through the tube at resonant frequencies of the gas in the tube. These resonant frequencies occur when almost any frequency above 1,000 c.p.s. is applied to the tube. Thus, a luminescent gas tube acts as a very good voltage regulator. The invention, therefore provides for the elimination of the elaborate ballasting circuitry used in prior gas tubes by taking advantage of these regulation characteristics of the tube (resulting from resonances of the gas in the tube) to let the tube perform its own ballast function. In the process of eliminating outside ballast by the decrease of pressure in the tube, it has been found that an almost four-to-one efficiency of the tube is achieved, that is to say, that at the lower pressures to be described hereinafter, the tube will produce four times as much light for each watt of input power as was heretofore true.

Another feature of applicant's flasher circuit includes the use of a storage capacitor in parallel with the battery, so that low battery power does not affect the behavior of the flasher, and the use of a transformer having an E–I configuration with a very closely controlled air gap width.

Applicant's invention has certain advantages which may be considered as features of applicant's invention. Applicant produces oscillations for illuminating the flasher tube during the time that a capacitance is being charged rather than being discharged. This causes the flasher tube in applicant's invention to be illuminated for a greater proportion of the time than if the flasher tube were illuminated during the discharge of the capacitance. Futhermore, as the capacitance becomes charged in applicant's invention, the charging current decreases such that the excitation of the flasher tube becomes correspondingly decreased. In order to compensate for this and provide a substantial excitation of the flasher tube during each energy burst, applicant's invention causes the frequency of the oscillations to be increased. By increasing the frequency of the oscillations as the energy burst continues, the level of energizing the flasher tube remains substantially constant even as the energy level decreases as that a relatively low level of energy can be provided to excite the flasher tube.

Although applicant includes a transformer and a capacitance in a circuit for producing this controlled effect and uses the charging of the capacitance and the increased effect of the air gap in the transformer to provide this effect, it will be appreciated that other means may be used without departing from the scope of the invention. Applicant's invention also provides a first impedance having a variable value for controlling the length of each energy burst for illuminating the flasher tube and a second impedance having a variable value for controlling the number of energy bursts per minute.

The above and other objects and advantages of the invention will be more clearly understood from the following detailed description of a typical embodiment of which:

FIGURE 1 is a circuit diagram illustrating one embodiment of a flasher circuit and/or pulse generator circuit according to the invention;

FIGURE 2 shows in graphical form the waveform generated by the circuit of FIGURE 1;

FIGURE 3 shows a transformer for use in the circuit of FIGURE 1;

FIGURE 4 is a schematic diagram of another circuit according to the principles of the instant invention; and FIGURE 5 illustrates waveforms of the voltage produced across a flasher tube by the circuit shown in FIGURE 4.

Referring first to FIGURE 1, the circuit illustrated schematically therein comprises an AC-responsive light source 10, such as a gas tube or other illuminating device, which it is desired to flash "on" and "off" at time intervals $t_1$ and $t_2$, respectively, by varying the input excitation signal applied at the tube electrodes.

The tube 10 has sealed ends 1 and 2, electrodes 3 and 4, and a glass envelope 5. The electrodes 3 and 4 are constructed of some filament material such as tungsten, which is covered with a coating 7 of another material chosen for its good electron-emission characteristics. These electron-emissive electrode coating materials 7 are often selected from one or more of the alkaline-earth oxides. The tube 10 is filled with molecules 6 of a luminescent gas, after being evacuated of as much normal air as possible by both pumping and burning caused by the running of a high current through the electrodes 3 and 4. The luminescent gas molecules 6 may be chosen from a number of elements, compounds, and mixtures thereof, many of them noble gases (helium, argon, neon, krypton and xenon), although some other possible luminescents are not: nitrogen, hydrogen, ammonia, natural gas, and radon. The best known mixture of the above elements and compounds is B10—a mixture of 10% neon and 90% argon. A preferred gas for the tube 10 in the practice of the instant invention is, however, neon gas, without further additives. The inside walls of the glass envelope 5 of the tube 10 can also be phosphor-coated, but the invention does not require it.

One of the features of applicant's invention is that he uses a tube with relatively low gas pressure. Furthermore, whereas prior art tubes were pumped to a certain pressure determined by tube diameter and the exact luminescent gas 6 mixture being used, the tube 10 of the instant invention uses a different gas pressure depending on its length $l$, in order to utilize the luminescent gas 6 for providing a ballasting effect. This ballasting effect occurs at frequencies where the tube gas 6 is in resonance, so that it presents a high impedance such as that in a parallel-resonant electronic circuit, thus limiting current flow and overall power delivered. At other frequencies, the gas is not in resonance and its impedance is relatively low such that substantial current flow occurs. Because of this, the tube should operate at proper pressures of the gas in the tube in order for the gas to provide its own ballast. This gas pressure is less than that previously used in flasher tubes and is dependent in part on the length of the tube. Accordingly, the invention includes the heretofore unknown principle of increasing tube 10 pressure with increases of length; so that for the same voltage, current, and/or power, the dwell time $t_1$ in FIGURE 2 will be substantially the same regardless of the length of tube used in the circuit. This occurs because the increased pressure decreases molecular travel distance in such proportion that the travel time of the ionization across the tube 10 becomes the same in spite of the increased length thereof.

FIGURE 2 shows the dimension $t_1$ applied to the oscillation envelope 11 and the time interval $t_2$ extending between successive oscillation envelopes 11. In this regard, the oscillations within each envelope have full amplitude over the time interval $t_1$, as provided by the circuit to be described in detail. Typically, but not necessarily, the oscillation frequency may be around 25 kilocycles. The waveshape of each oscillation is optimum for gas tube illumination: somewhat square-topped on the positive half of the cycle and deep and sharp on the negative half.

Referring back to FIGURE 1, the circuit includes a transistor 12 illustrated as of PNP type, with a DC source 13 of relatively low voltage in the emitter-collector circuit of the transistor 12, the latter having emitter, collector and base electrodes 14, 15 and 16, respectively. As will become apparent subsequently, the transistor 12 may be considered as one form of "active switching member" or "current control member" for the purposes of the claims. The circuit also includes a transformer 17 having an output or secondary winding 18 electrically connected with a light source 10, as through a capacitor 19, and primary winding 20 connected in the emitter-base circuit of the transistor. In this regard, inductive coupling from the transformer in the emitter-collector circuit is provided, as for example, by tapping the transformer primary or input winding at 21 to thereby connect the winding 20a in the emitter-collector circuit. The transformer should be of a non-saturating core type during operation so as not to terminate the forward stroke of the oscillation cycle, and the core 22 is typically made of ferrite or low-grade silicon steel for this purpose. FIGURE 3 shows a particularly advantageous core 22 having stacks 30 and 31 of E and I laminations. A controlled thickness gap is provided by an epoxide resin layer 32 between the stack 31 and the terminals of the E stack legs, the epoxide also bonding together the two stacks of laminations as shown. All windings of the core 22 are on the center leg of the E-shaped portion thereof.

The components comprising the time constant network of the flasher circuit of FIGURE 1 include a capacitor 23 and that portion of the primary 20 of the transformer 17 that is in the emitter-base circuit of the transistor 12, labelled 20b. One plate of the capacitor 23 is directly coupled to the base 16, the control electrode of the transistor 12, and the other plate is coupled through a resistor 26 to the second end of the primary 20. The series combination of a unidirectional conductive device 24 and a resistor 25 are coupled in parallel with the capacitor 23. When the capacitor 23 is being charged from the battery 13, it causes oscillations to be produced in the transistor 12 and these oscillations cause the flasher tube 10 to become illuminated.

In the operation of the circuit shown schematically in FIGURE 1 and described above, the transistor 12 is in its "on" or conductive state during the time period $t_1$ (FIGURE 2) and is in its "off" or non-conductive state during the time period $t_2$. Typically, the time period $t_1$ might be 40 milliseconds for a tube length of approximately 12", while the length of the time period $t_2$ depends purely on the interval desired between flashes of the illuminating device 10. Thus, the flasher circuit of FIGURE 1 is a great improvement upon prior blocking oscillator type flashers, such as that in the above cited KaDell patent, where short "on" times (5 microseconds) and relatively large power dissipation are unavoidable. The AC oscillations within the envelope 11 of FIGURE 2 occurred during the "on" time of the transistor 12 because of the series-resonant behavior of the capacitor 23 with that portion of the primary 20 in series therewith. When the transistor 12 is in its "on" state, current flows from the positive terminal of the battery 13 through the portion 20a of the primary of the transformer 17 and from the emitter 14 to the collector 15 and thence back to the negative terminal of the battery 13. The current through the portion 20a of the primary of the transformer 17 induces a magnetic flux therethrough.

Since many of the lines of flux originating in the portion 20a of the primary are linked through the remaining portion 20b, a current is induced in the portion 20 by mutual inductance and initially the back E.M.F. developed in the remaining or emitter-base portion 20b of the primary 20 causes a voltage drop thereacross. As a result of this voltage drop, the capacitor 23 begins to charge at a rate regulated by the resistor 26. This charging is done in a series of surges which induce counter-surges, because of the back E.M.F. in the primary 20 whenever a new rate of current flow occurs therein. The current surges and the negative feedback in the transistor 12 cause the transistor to act as an oscillator and produce oscillatory signals during the charging of the capacitor 23, the negative feedback being provided by the winding portion 20b and the capacitor 23. However, the current flow through the capacitor 23 has a DC component which leads to an accumulation of positive charge on the capacitor plate coupled to the base 16. When the voltage on this plate and consequently on the base 16 itself exceeds the voltage on the emitter 14, the transistor 12 is cut off; and current ceases to flow in the emitter-collector circuit thereof for the duration of the period $t_2$ shown in FIGURE 2. When the transistor 12 is in the "off" condition, the capacitor 23 is free to discharge through the resistor 25 and unidirectional conductive device 24 at a rate determined by the value of the resistor 25. When the capacitor 23 is discharged sufficiently that the voltage on the base 16 goes below that of the emitter 14, the transistor 12 "fires" or switches into its conductive state and another oscillation period $t_1$ is commenced.

I have set up and successfully operated the circuit of the present invention with the following values and characteristics for the components illustrated. It should be clearly understood, however, that these values are illustrative only:

| | |
|---|---|
| Voltage of source 13 | 12 volts. |
| Transistor 12 | 2 N 554 (DELCO). |
| Resistor 25 | 1200 ohms, ½ watt, 10%. |
| Resistor 26 | 820 ohms, ½ watt, 10%. |
| Capacitor 23 | 75 μf.—Electrolytic 12 wv. DC. |
| Type diode 24 | 100 volt peak inverse voltage; 200 ma. silicon diode. |
| Coil 18 | 6200 turns #40 Formvar wire. |
| Coil 20 | 70 turns #31 Formvar wire. |
| Coil 20a | 123 turns #31 Formvar wire. |
| Core 22 | ⅜" stack—M6X silicon steel, 14 MIL lamination EI Butt Stack with epoxy to provide ¼ MIL gap. |
| Capacitor 19 | .000012 to .015 μf. to match used. |
| Type tube 10 | 5" diameter; 12" length; 6 mm. Hg neon gas. |

The above specified circuit gave a 40 millisecond flash time ($t_1$) at the rate of 35 flashes per minute. However, the flash time $t_1$ could be made as high as half a minute or as low as the microsecond range, although 10–100 milliseconds is the practical range from the brilliance and power consumption standpoints. In like manner, the flash rate can be made anything from two per minute or less to 200 per minute or more, merely by changing the above values. It should be noted that, according to the teachings of the prior art, whatever the length of the tube 10, it would still be pumped to about 15 mm. Hg pressure, rather than the 6 mm. Hg specified herein. Moreover, to illustrate the effect of gas pressure on performance of the tube 10, in the above specified circuit for any fundamental frequency of the input waveform above 1,000 c.p.s., variation of gas pressure within particular limits will vary the dwell time $t_1$, and the flash rate while leaving the power drain of the circuit substantially undisturbed, as evidenced by a current flow of 13.5 milliamps. For example, raising the pressure of the neon gas 6 to 7 mm. Hg will result in a dwell time of 35 milliseconds and a flash rate of 44. Another rise to 8 mm. Hg (mercury) of neon will give a dwell time $t_1$ of 30 milliseconds and a flash rate of 48. Raising the neon gas 6 to 9 mm. Hg (mercury) of pressure will raise the current to 14 milliamps, showing that the parallel resonant impedance of the gas 6 is just starting to shift from the resonant condition, and will give a 25 millisecond dwell time at a rate of 58 flashes per minute. At increased pressures above 9 mm. Hg, the current increases substantially, thereby causing the tube to overheat and become inefficient. This indicates that the tube is not operating at a parallel resonant condition when the pressure of the gas in the tube is increased above a particular value depending upon the length of the tube.

In accordance with the feature of the invention that teaches increase of the pressure of the luminescent gas molecules 6 as the length of the tube 10 is increased, increasing the length of the tube 10 specified above (5" diameter, neon gas) from 12" to 24" would require an increase in pressure to 16 mm. Hg. Thus, it can be seen that the distance of molecule travel in the tube 10 (decreasing as pressure is increased) influences the resonance characteristics of the tube 10 and, as a consequence, the voltage and current levels enforced across the electrodes 3 and 4.

Referring to FIGURE 4, it will be seen that the circuit illustrated therein is a variation of the circuit of FIGURE 1, in which the capacitor 19, the resistors 25 and 26 and the unidirectional conductive device 24 are no longer used. On the other hand, a capacitor 40 is coupled in parallel with the battery 13 in order to store charge to the full voltage across the battery during the time $t_2$ between flash periods $t_1$. In addition, a variable resistor 42 is coupled between the capacitor 23 and the base 16 of the transistor 12, and a variable resistor 44 is coupled between the capacitor 23 and the negative terminal of the battery 13.

In the operation of the circuit of FIGURE 4, when the transistor 12 is "on," the setting of the variable resistor 42 controls the speed of charge accumulation in the capacitor 23. In the other mode of the flasher, after the transistor 12 turns "off" (time $t_2$), the charge accumulated in the capacitor 23 discharges through the resistor 44 to the negative terminal of the battery 13. Obviously, the value set for the variable resistor 44 governs the speed of discharge of the capacitor 23 and, consequently, the length of the period $t_2$ between flashes of the light 10.

The transformer 17 used in both the circuit of FIGURE 1 and that of FIGURE 4 is, as shown in FIGURE 3, made of E-shaped and I-shaped laminations joined together with a gap 32 in between. Since, as stated above, the primary 20 and the secondary 18 of the transformer 17 are wound together on the center leg of the E, lines of flux induced by currents therethrough must cross the gap 32 in order to make a closed loop outside the inducing coil (FIGURE 3, dotted lines). Much as with the dielectric in a capacitor, the air gap 32 passes the AC oscillations during time $t_1$, but presents "impedance" to DC components thereof, thus decreasing the negative feedback provided through the inductance 20b. This means both the number of oscillations per burst $f_1$ may be varied by varying the characteristics of the air gap 32 and also that the frequency of the oscillations toward the end of each burst is higher (e.g. Start: 800 c.p.s.; Finish: 1600 c.p.s.).

As is well known, the current for charging a capacitor decreases as the capacitor becomes charged. This causes the slope of the envelope in FIGURE 2 and 5 to have a negative characteristic, at least in the positive half of the envelope. However, since the frequency of the oscillatory signals in the envelope increases as the slope of the positive portion of the envelope decreases, the energy supplied to the light source 10 throughout each energy burst remains substantially constant. This causes the light source 10 to be illuminated at a substantially constant level throughout each energy burst. Furthermore, the source 10 is illuminated at a substantially constant level at a relatively low energy level which becomes even lower as the energy burst continues.

As the capacitor 23 becomes charged, an increased level of direct current flows between the base and emitter of the transistor 12 because of the increased charge. This increased current also flows through the portion 20b of the primary winding 20 and tends to decrease the level of the inductance in the transformer. As the level of the inductance in the transformer decreases, the effect of the air gap in the transformer becomes increasingly pronounced. This causes the negative feedback provided from the transformer 17 to the transistor 12 to become decreased as the energy burst continues. In view of the decreased feedback, the period of time required for each oscillatory cycle of current through the transistor 12 decreases so that the frequency of the oscillations increases. The increase in frequency may also be seen from the fact that the increased DC level in the transformer requires a decreased excursion of the inductance level toward saturation of the transformer core in a positive direction so that the time for such excursion tends to decrease.

As the frequency of the oscillatory cycles increases toward the end of each energy burst, the increment of charge introduced into the capacitor 23 tends during each cycle of oscillation to decrease. This, in turn, causes the number of cycles produced during each energy burst to further increase. In view of this, the frequency of the oscillations at the end of the burst is able to further increase and compensate still more for the negative slope of the positive portion of the envelope in FIGURE 5.

As will be seen, the negative portion of the envelope in FIGURE 5 tends to have a substantially constant amplitude. This results from the fact that, as the DC level in the transformer tends to rise in a positive direction, the inductive excursion toward negative saturation of the core tends to increase. Since the excursion toward negative saturation of the core tends to increase, increased amplitudes of the signal are produced in the negative direction. These increased amplitudes tend to compensate for the decreased amplitudes resulting from the decreases in the charging current through the capacitor 23 so that the negative amplitude of the envelope in FIGURE 5 tends to remain substantially constant.

The transformer 17 has another important distinctive feature not shown or suggested in the prior art of flashers or the like: the tap 21 is not a center tap but is, rather, relatively close to the first end of the primary 20, so that the output portion 20a has only ⅓, ¼, or less the number of turns of the feedback portion 20b. This predominance of the feedback inductance 20b causes the circuits of FIGURES 1 and 4 to function in exactly the opposite manner from that of the prior art blocking oscillators; for where the KaDell flasher and many like it can manage only very short bursts during the discharge of the capacitor $C_1$, the instant invention teaches the construction of a one-transistor circuit wherein an oscillator is "on" or in its conductive state until the charge on its time-constant capacitor 23 or other device turns it "off." This means that sudden discharges of the capacitor 23 are avoided, contributing greatly to its service life. Moreover, in circuits according to the invention, the burst time $t_1$ can be made as long as desired, although bursts much above 40 milliseconds for a tube length of 12" may be wasteful of battery power. The very short (5 microsecond) bursts put out by prior art blocking-type oscillators are also wasteful, however, because their shortness requires enormous current drains in order to match the brilliance of lighting that a 20 millisecond burst achieves on small power drain, illumination brilliance being inversely proportional to duration in the short, microsecond periods being dealt with here.

Another important area of improvement of the instant invention relates to the design, construction and contents of the luminescent tube in which the flasher lighting effect actually takes place. Whereas prior art tubes were pumped to a certain pressure determined by tube diameter and the exact luminescent gas mixture being used, the tube 10 of the instant invention varies in gas pressure, depending on its length, in order to cause the luminescent gas 6 to provide a ballasting effect. This ballasting effect occurs because, at frequencies where the tube gas 6 is in resonance, it presents a high impedance as in a parallel resonant electronic circuit, thus limiting current. The pressure of the gas in the tube should be limited to those where resonances of the gas in the tube can occur. One reason is that, at frequencies where the gas is not in resonance and its impedance is relatively low, the relatively high flow of current through the tube will prevent the tube from performing the ballasting function necessary to compensate for the negative volt-ampere characteristics of the tube and to limit current flow so the tube does not burn up. Accordingly, the invention includes the heretofore unknown principle of using a tube with a relatively low gas pressure. The invention also includes the feature of increasing tube pressure with increase of the tube length, so that for the same voltage, current, and/or power, the dwell time $t_1$ will be the same regardless of the length of the tube used in the circuit. This occurs because the increased pressure for increased tube length decreases molecular travel distance in such proportion that the travel time across the tube becomes the same in spite of the increased length thereof.

Although the invention has been described in its preferred form with a certain degree of particularity, it is understood that the present disclosure of the preferred form has been made only by way of example and that numerous changes in the details of construction and the combination and arangements of parts may be resorted to without departing from the spirit and the scope of the invention as hereinafter claimed.

What is claimed is:

1. In combination:
a light source having properties of providing illumination when energized by signals alternating frequencies;
a charge-storage device having properties of becoming charged and becoming subsequently discharged;
first means operatively coupled to the charge-storage device for producing a flow of current through the charge-storage device to charge the charge-storage device and for providing the current with a progressively decreasing amplitude as the charge-storage device becomes charged;
second means operatively coupled to the charge-storage device and responsive to the charging current flowing through the charge-storage device for producing alternating signals having an amplitude directly related to the amplitude of the current and having a frequency inversely related to the amplitude of the charging current;
third means operatively coupled to the second means for introducing the alternating signals to the light source to illuminate the light source; and
fourth means operatively coupled to the charge-storage device for obtaining a discharge of the charge-storage device upon a charge of the charge-storage device to a particular value.

2. The combination set forth in claim 1 wherein the charge-storage device is capacitive and wherein the first means includes a first impedance having a value variable to control the rate at which the charge-storage device becomes charged to the particular value and wherein the fourth means includes a second impedance having a value variable to control the rate at which the charge-storage device becomes discharged upon the storage of energy at the particular value in the charge-storage device.

3. In combination:
a direct source of voltage;
energy-storage means having properties of storing energy upon a flow of current through the energy-storage means and of producing a reduced flow of current upon the occurrence of such energy storage and having properties of discharging such energy;
switching means having conductive and non-conductive states;
means connecting the source of voltage, the energy-storage means and the switching means in a first circuit to obtain a flow of current through the energy-storage means and the switching means and to obtain an oscillatory operation of the switching means between the conductive and non-conductive states during the storage of energy in the energy-storage means, the last-mentioned means having properties of increasing the frequency of the oscillatory operation of the switching means between the conductive and non-conductive states upon a decrease in the flow of current through the energy-storage means;
a light source connected in a second circuit with the last-mentioned means to become illuminated during the oscillatory operation of the switching means between the conductive and non-conductive states; and
means operatively connected to the energy-storage means and the switching means for obtaining a discharge of the energy from the energy-storage means upon the storage of a particular amount of energy in the energy-storage means.

4. The combination set forth in claim 3 wherein the means connecting the source of voltage, the energy-storage means and the switching means in the first circuit includes an inductively reactive means having an air gap which tends to become pronounced with the progressive storage of energy in the energy-storage means and increase the frequency in the oscillatory operation of the switching means between the conductive and non-conductive states.

5. A flasher circuit comprising:
a neon tube having first and second input excitation signal electrodes;
a transformer having a non-saturating E–I laminated core with a gap between the E and I portions and having a primary and secondary, the primary of the transformer being tapped at a point less than one-third the distance from a first end of the primary to a second end, a first end of the secondary being coupled to the first input excitation signal electrode of the neon tube and a second end of the secondary being coupled to the second input excitation signal electrode of the neon tube;
a battery having positive and negative terminals, the positive terminal of the battery being coupled to a first end of the primary of the transformer;
a PNP transistor having an emitter, base and collector, the collector of the PNP transistor being directly coupled to the negative terminal of the battery and the emitter of the PNP transistor being coupled to a tap on the primary of the transformer;
a first capacitor having first and second plates, the first plate of the first capacitor being coupled to a second end of the primary of the transformer and the second plate of the first capacitor being coupled through a first resistor to the base of the PNP transistor and through a second resistor to the negative terminal of the battery; and
a second capacitor coupled in parallel with the battery.

6. A flasher circuit comprising:
an illuminating device having input excitation signal electrodes;
a transformer having a primary and secondary, the ends of the secondary of the transformer being coupled to the input excitation signal electrodes of the illuminating device;
a power source having first and second terminals, the first terminal of the power source being coupled to a first end of the primary of the transformer;
an active switching device having input, output and control electrodes, the output electrode of the active switching device being directly coupled to the second terminal of the battery and the input electrode of the active switching device being coupled to a tap on the primary of the transformer;

a capacitor having first and second plates, the first plate of the capacitor being coupled through a first variable resistor to a second end of the primary of the transformer and the second plate of the capacitor being directly coupled to the control electrode of the active switching device; and the series combination of a second variable resistor and a unidirectional conductive device coupled in parallel with the capacitor.

7. A flasher circuit comprising:

a neon tube having first and second input excitation signal electrodes;

a first capacitor coupled to the first input excitation signal electrode of the neon tube;

a transformer having a non-saturating E–I laminated core with a gap between the E and I portions and having primary and secondary windings, the primary of the transformer being tapped at a point less than one-third the distance from a first end of the primary to a second end, a first end of the secondary of the transformer being coupled to the first capacitor and a second end of the secondary of the transformer being coupled to the second input excitation signal electrode of the neon tube;

a battery having positive and negative terminals, the positive terminal of the battery being coupled to a first end of the primary of the transformer, a PNP transistor having an emitter, base and collector, the collector of the PNP transistor being directly coupled to the negative terminal of the battery and the emitter of the PNP transistor being coupled to a tap on the primary of the transformer;

a second capacitor having first and second plates, the first plate of the second capacitor being coupled through a first variable resistor to a second end of the primary of the transformer and the second plate of the capacitor being directly coupled to the base of the PNP transistor; and the series combination of a second variable resistor and a unidirectional conductive device coupled in parallel with the second transistor.

8. In combination:

a tube having a sealed envelope and having gas in the tube at a relatively low pressure, the gas having properties of becoming ionized when energized at relatively high frequencies and becoming resonant and luminescent when ionized at the relatively high frequencies to obtain an ionization of the gas within the tube and resonances of the gas within the tube for an illumination of the tube, and means operatively coupled to the tube for introducing to the tube signal bursts having a frequency in the range of the relatively high frequencies and having a progressively increasing frequency in the range of the relatively high frequencies during progressive time intervals in each burst to obtain an ionization of the gas within the tube and the resonances of the ionized gas within the tube.

9. A flasher circuit, including:

a neon tube having first and second input excitation signal electrodes and having gas in the tube at a relatively low pressure, the gas having properties of becoming ionized when energized at a relatively high frequency and of becoming luminescent when energized;

a transformer having a non-saturating core with a gap therein and having a primary with first and second end terminals and an intermediate tap between the end terminals and having a secondary with a pair of end terminals, the first end terminal of the secondary being coupled to the first input excitation signal electrode of the neon tube and the second end terminal of the secondary being coupled to the second input excitation signal electrode of the neon tube;

a battery having positive and negative terminals, the positive terminal of the battery being coupled to the first end terminal of the primary of the transformer;

a PNP transistor having an emitter, base and collector, the collector of the PNP transistor being directly coupled to the negative terminal of the battery and and the emitter of the PNP transistor being coupled to the intermediate tap on the primary of the transformer;

a first resistor;

a second resistor;

a first capacitor having first and second plates, the first plate of the first capacitor being coupled to the second end terminal of the primary of the transformer to control the rate of charging the capacitor and the second plate of the first capacitor being coupled through the first resistor to the base of the PNP transistor and through the second resistor to the negative terminal of the battery to obtain a discharge of the capacitor upon the charging of the capacitor to a particular value, the capacitor having a capacitive reactance relative to the inductive reactance of the transformer to provide for a charging of the capacitor and an oscillatory current at the relatively high frequency through the capacitor, the base and emitter of the transistor and the primary of the transformer between the second end terminal and the intermediate tap for an energizing of the tube at the relatively high frequency; and a second capacitor coupled in parallel with the battery.

10. The flasher circuit set forth in claim 9 wherein the first and second resistors are adjustable in value.

11. In combination:

charge-storage means having properties of becoming charged and becoming subsequently discharged;

first means operatively coupled to the charge-storage means for obtaining a discharge of the charge-storage means upon a charge of the charge-storage means to a particular value;

a current control member;

a tube having a sealed envelope of a particular length, there being gas in the tube at a relatively low pressure dependent upon the length of the sealed envelope, the gas having properties of becoming ionized when energized and of becoming luminescent when ionized; and second means connected in electrical circuitry with the tube, the current control member and the charge-storage means for introducing energy to the tube and to the charge-storage means to obtain the charging of the charge-storage means and the production of oscillatory signals at progressively increasing frequencies in the current control member during the charging of the charge-storage means and the energizing of the gas in the tube during the charging of the charge-storage means.

12. The combination set forth in claim 11 wherein the second means includes a source of direct voltage and includes inductively reactive means having a pair of end terminals respectively connected to the source of direct voltage and the charge-storage means and having an intermediate tap connected to the current control member to obtain a bias for producing oscillatory signals in the current control member during the charging of the charge-storage means.

13. In combination:

a charge-storage means having properties of becoming charged and becoming subsequently discharged;

first means operatively coupled to the charge-storage means for progressively charging the charge-storage means;

second means operatively coupled to the charge-storage means for obtaining a discharge of the charge-storage means upon a charge of the charge-storage means to a particular value;

a tube having a sealed envelope and having an input electrode; and third means operatively coupled to the charge-storage means and to the input electrode of the tube for obtaining the introduction of energy to the tube at progressively increasing frequencies during the charging of the charge-storage means to obtain a lighting of the tube;

there being luminescent gas in the tube at a pressure to enhance the lighting of the tube at the progressively increasing frequencies at which the tube is energized.

14. In combination:

a tube having a sealed envelope and having gas in the tube at a relatively low pressure to obtain an ionization of the gas within the tube and resonances of the ionized gas within the tube during such ionization for an illumination of the tube;

charge-storage means;

means operatively coupled to the tube and to the charge-storage means to introduce to the tube and the charge-storage means signal bursts separated from one another by time intervals to obtain a charging of the charge-storage means and an ionization of the gas within the tube and the resonances of the ionized gas within the tube during the period of charging of the charge-storage means; and means connected to the charge-storage means for obtaining a discharge of the charge-storage means during the intervals between the signal bursts.

15. The combination set forth in claim 14 where the pressure of the gas within the tube is dependent upon the length of the tube.

16. In combination:

a tube having a sealed envelope and having gas in the tube at a relatively low pressure to obtain an ionization of the gas within the tube and resonances of the gas within the tube during such ionization for an illumination of the tube;

a capacitor;

a current control member;

means having an inductive reactance and operatively coupled to the capacitor and to the current control member for obtaining a charge of the capacitor to a particular value;

means operatively coupled to the capacitor and operative during the charge of the capacitor to the particular value to introduce signals to obtain an ionization of the gas within the tube and the resonances of ionized gas within the tube during such charging of the capacitor; and means operatively coupled to the capacitor for obtaining a discharge of the capacitor upon each charging of the capacitor to the particular value.

17. In combination, a light source having molecules of a luminescent gas disposed within the tube at a particular pressure with properties of becoming ionized when energized and of providing illumination when ionized by electrical signals at alternating frequencies;

charge-storage means having a capacitive reactance and having properties of becoming charged and become subsequently discharged;

first means operatively coupled to the charge-storage means for obtaining a progressive charging of the charge-storage means;

second means having an inductive reactance;

third means including the second means and operatively coupled to the charge-storage means and to the light source for introducing alternating signals to the light source during the charging of the charge-storage means to obtain an energizing of the gas in the light source;

fourth means operatively coupled to the charge-storage means for obtaining a discharge of the charge-storage means upon a charging of the charge-storage means to a particular value, the third means are operative to introduce alternating signals to the light source at frequencies of a relatively high and progressive increasing value during the charging of the charge-storage means.

References Cited

UNITED STATES PATENTS

| | | | |
|---|---|---|---|
| 2,930,989 | 3/1960 | Krieger | 315—206 X |
| 3,014,209 | 12/1961 | Nunn | 315—219 X |
| 3,016,478 | 1/1962 | Kadell | 315—241 X |

JAMES W. LAWRENCE, *Primary Examiner.*

S. A. SCHNEEBERGER, *Assistant Examiner.*